United States Patent
Jun et al.

(10) Patent No.: US 10,601,048 B2
(45) Date of Patent: Mar. 24, 2020

(54) ELECTRODE AND METHOD FOR MANUFACTURING SAME

(71) Applicant: LG CHEM, LTD., Seoul (KR)

(72) Inventors: Ji Hyun Jun, Daejeon (KR); Sung Joon Oh, Daejeon (KR); Shin Wook Jeon, Daejeon (KR); Jin Oh Song, Daejeon (KR); Choong Min Yi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 141 days.

(21) Appl. No.: 15/564,955

(22) PCT Filed: Apr. 5, 2016

(86) PCT No.: PCT/KR2016/003492
§ 371 (c)(1),
(2) Date: Oct. 6, 2017

(87) PCT Pub. No.: WO2016/163705
PCT Pub. Date: Oct. 13, 2016

(65) Prior Publication Data
US 2018/0090765 A1   Mar. 29, 2018

(30) Foreign Application Priority Data

Apr. 7, 2015   (KR) .................. 10-2015-0048890

(51) Int. Cl.
| | | |
|---|---|---|
| *H01M 4/62* | (2006.01) | |
| *H01M 4/13* | (2010.01) | |
| *H01M 4/139* | (2010.01) | |
| *H01M 4/66* | (2006.01) | |
| *H01M 4/36* | (2006.01) | |
| *H01M 10/05* | (2010.01) | |

(Continued)

(52) U.S. Cl.
CPC ......... *H01M 4/623* (2013.01); *H01M 4/0404* (2013.01); *H01M 4/13* (2013.01);
(Continued)

(58) Field of Classification Search
CPC .... H01M 4/623; H01M 4/0404; H01M 4/661; H01M 4/131; H01M 4/13; H01M 10/05; H01M 4/66; H01M 4/36
See application file for complete search history.

(56) References Cited

U.S. PATENT DOCUMENTS

| | | | |
|---|---|---|---|
| 2009/0202907 A1* | 8/2009 | Muraoka | H01M 4/13 429/217 |
| 2015/0263333 A1* | 9/2015 | Kinugawa | H01M 4/621 429/217 |

(Continued)

FOREIGN PATENT DOCUMENTS

| | | |
|---|---|---|
| JP | 2006-107780 A | 4/2006 |
| JP | 4801233 B1 | 8/2011 |

(Continued)

OTHER PUBLICATIONS

English Translation KR 10-2013-0044160 (Year: 2013).*
European Search Report for Appl. No. 16776808.4 dated Jul. 26, 2018.
International Search Report, issued in PCT/KR2016/003492, dated Jul. 25, 2016.

*Primary Examiner* — Stewart A Fraser
(74) *Attorney, Agent, or Firm* — Birch, Stewart, Kolasch & Birch, LLP (57) ABSTRACT

The present invention relates to an electrode, a method for manufacturing same, and a battery comprising the electrode. An electrode and a method for manufacturing same can be provided wherein the electrode of the present invention prevents a segregation phenomenon by which a binder is concentrated on the surface of the electrode, thereby comprising an active layer exhibiting excellent peel strength on a current collector.

19 Claims, 1 Drawing Sheet

(51) Int. Cl.
*H01M 4/04* (2006.01)
*H01M 4/131* (2010.01)
*H01M 10/052* (2010.01)
*H01M 4/02* (2006.01)

(52) U.S. Cl.
CPC ........... *H01M 4/131* (2013.01); *H01M 4/139* (2013.01); *H01M 4/36* (2013.01); *H01M 4/66* (2013.01); *H01M 4/661* (2013.01); *H01M 10/05* (2013.01); *H01M 4/62* (2013.01); *H01M 10/052* (2013.01); *H01M 2004/027* (2013.01); *H01M 2004/028* (2013.01)

(56) References Cited

U.S. PATENT DOCUMENTS

2015/0303478 A1* 10/2015 Kinugawa ............. H01M 4/622
429/217
2015/0380739 A1* 12/2015 Watanabe ............... H01M 4/13
429/217

FOREIGN PATENT DOCUMENTS

| JP | 2012-4066 A | 1/2012 |
|----|----|----|
| JP | 2013-84383 A | 5/2013 |
| JP | 2013-89573 A | 5/2013 |
| JP | 2013-171643 A | 9/2013 |
| JP | 2014-127436 A | 7/2014 |
| JP | 2014-130742 A | 7/2014 |
| JP | 2015-32466 A | 2/2015 |
| KR | 10-2011-0137735 A | 12/2011 |
| KR | 10-2013-0044160 A | 5/2013 |

* cited by examiner

ELECTRODE AND METHOD FOR MANUFACTURING SAME

TECHNICAL FIELD

The present invention relates to an electrode, a method for manufacturing the same, and a battery comprising the electrode.

The present invention claims the benefit of priority based on Korean Patent Application No. 10-2015-0048890 filed on Apr. 7, 2015, the disclosure of which is incorporated herein by reference in its entirety.

BACKGROUND ART

The electrode for a secondary battery can be produced, for example, by preparing an active material, a conductive material, and a dispersed binder in a slurry paste state and then applying them on a current collector, followed by drying, rolling and further drying.

At this time, the binder in the electrode plays a role of ensuring flexibility of the electrode, and maintaining a sufficient binding force with the current collector.

On the other hand, one of the factors determining the flexibility of the electrode and the sufficient binding force with the current collector may include the content of the binder depending on the depth of the electrode. That is, the distribution of the binder in the electrode is an important factor in determining the flexibility of the secondary battery and the binding force with the current collector.

A drying process is required after applying a composition comprising a binder on a current collector to produce an electrode, but when the predetermined drying process is performed, a fine structure change is caused inside the electrode, whereby a problem that the performance of the electrode is deteriorated may be caused.

The above problem can be represented by a segregation phenomenon in which a binder existing in an electrode layer moves to a surface of the electrode during the drying process. Due to such a segregation phenomenon, there may be a problem that the binder is not evenly distributed inside the electrode, but biased to the surface.

Accordingly, various attempts are required to overcome the above-mentioned segregation phenomenon and binding force problems of the electrode capable of being caused therefrom.

PRIOR ART DOCUMENT (Patent Document 1): Japanese Laid-Open Patent Publication No. 2006-107780

DETAILED DESCRIPTION OF THE INVENTION

Technical Problem

The present invention provides an electrode comprising an active layer having excellent peel strength on a current collector by preventing a segregation phenomenon in which a binder moves to an electrode surface, and a method for manufacturing the same.

The present invention also provides a battery comprising such an electrode.

Technical Solution

The present invention is devised to achieve the above object, and relates to an electrode comprising a current collector and an active layer formed on the current collector and having a binder. The electrode has a BMI (I/S) represented by Equation 1 below in a range of 0.018 to 0.300.

$$BMI(I/S)=BMI(Interface)/BMI(Surface) \quad [\text{Equation 1}]$$

In Equation 1, BMI (Interface) means an amount (%) of the binder present in a region corresponding to 0% to 15% in the thickness direction of the active layer, on the basis of a surface of the active layer in contact with the current collector, relative to the amount of the total binder present in the active layer, and BMI (Surface) represents an amount (%) of the binder present in a region corresponding to 85% to 100% in the thickness direction of the active layer, on the basis of the surface of the active layer in contact with the current collector, relative to the amount of the total binder present in the active layer.

In one example, the BMI (Interface) may be in a range of 0.8% to 6.0%.

In one example, the BMI (Surface) may be in a range of 22.0% to 42.3%.

In one example, the active layer may have peel strength of 30 gf/cm or more on the current collector when an electrode specimen having a size of 15×150 $mm^2$ is measured at room temperature with a peeling speed of 0.3 m/min and a peeling angle of 180 degrees.

The present invention also relates to a method for manufacturing an electrode having a BMI (I/S) in the range of 0.018 to 0.300 which comprises a step of applying a composition for forming an active layer comprising a binder, a conductive material and an active material on a current collector, followed by drying.

In the method for manufacturing an electrode according to the present invention, the step of drying may comprise the following steps 1) to 4).

1) a step of preheating a current collector applied by a composition for forming an active layer;
2) a step of fixed rate evaporating the preheated current collector;
3) a step of lapse rate evaporating; and
4) a step of removing a residual solvent at a temperature lower than the preheating step.

In one example, the step 1) can be performed in the range of 150° C. to 180° C.

In one example, the step 2) can be performed at a lower temperature in a range of 25° C. to 60° C. relative to the step 1). In addition, after completing the step 2), the residual solvent in the electrode may be in the range of 1% by weight to 5% by weight.

In one example, the step 3) can be performed in the range of 90° C. to 105° C. In addition, after completing the step 3), the residual solvent in the electrode may be in the range of 0.05% by weight to 0.8% by weight.

In one example, the step 4) can be performed in the range of 130° C. to 145° C. In addition, after completing the step 4), the residual solvent in the electrode may be 0.05% by weight or less.

In one example, the drying step may further comprise, after the step of removing the residual solvent, a step of reducing the temperature to a temperature lower in the range of 50° C. to 100° C. than the step of removing the residual solvent.

The present invention also relates to a battery comprising the electrode.

Effect of the Invention

The present invention may provide an electrode comprising an active layer having excellent peel strength on a current collector by preventing a segregation phenomenon in which a binder moves to the electrode surface, and a method for manufacturing the same.

EXPLANATION OF REFERENCE NUMERALS

100: electrode
200: current collector
300: active layer

MODE FOR CARRYING OUT THE INVENTION

Hereinafter, the present invention will be described in more detail by way of examples, but they are only examples limited to the gist of the present invention. Furthermore, it will be apparent to those skilled in the art that the present invention is not limited to the process conditions set forth in the examples, where the conditions can be optionally selected within the range necessary for achieving the object of the present invention.

The present invention relates to an electrode included in a battery and a method for manufacturing the same. More specifically, the present invention relates to an electrode comprising a current collector and an active layer, wherein the active layer has excellent peel strength on the current collector, and a method for manufacturing the same.

The present invention may provide an electrode in which the segregation phenomenon that may occur during the drying process after applying a composition for forming an active layer comprising a binder on a current collector is minimized, and the BMI (I/S) satisfies a predetermined range.

The present invention may also provide a method for manufacturing an electrode comprising an active layer having excellent peel strength on a current collector by controlling the temperature of a drying process for each step after applying the composition for forming an active layer on a current collector.

The present invention relates to an electrode comprising a current collector and an active layer formed on the current collector and having a binder, wherein a BMI (I/S) represented by Equation 1 below is in the range of 0.018 to 0.300.

$$BMI(I/S) = BMI(Interface)/BMI(Surface) \quad \text{[Equation 1]}$$

In Equation 1, BMI (Interface) means an amount (%) of the binder present in a region corresponding to 0% to 15% in the thickness direction of the active layer, on the basis of a surface of the active layer in contact with the current collector, relative to the amount of the total binder present in the active layer, and BMI (Surface) represents an amount (%) of the binder present in a region corresponding to 85% to 100% in the thickness direction of the active layer, on the basis of the surface of the active layer in contact with the current collector, relative to the amount of the total binder present in the active layer. Here, the amount of the total binder present in the active layer may mean the amount of the total binder contained in the composition for forming an active layer.

The electrode of the present invention comprises a current collector and an active layer formed on the current collector. The active layer comprises a binder.

Figure 1:
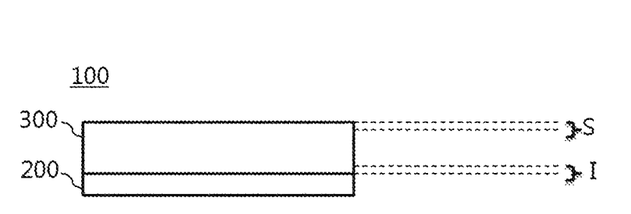
FIG. 1 is a diagram of an electrode comprising a current collector and an active layer of the present invention.

More specifically, the electrode (100) of the present invention has a structure comprising a current collector (200) and an active layer (300) as shown in FIG. 1, may include a region (S) corresponding to 85% to 100% in the thickness direction of the active layer, on the basis of the surface of the active layer in contact with the current collector and a region (I) corresponding to 0% to 15% in the thickness direction of the active layer, on the basis of the surface of the active layer in contact with the current collector. Here, a region corresponding to 0% in the thickness direction of the active layer means the surface in contact with the active layer and the current collector.

Generally, a process for manufacturing an electrode includes a process of drying a current collector applied by an active layer comprising a binder, where a segregation phenomenon may occur, that is, the binder in the electrode may move toward the surface (first surface, upper surface) of the electrode, for example, into the region (S) corresponding to 85% to 100% in the thickness direction of the active layer from the surface (second surface, lower surface) of the active layer in contact with the current collector, during the drying process.

Such a segregation phenomenon may reduce the amount of the binder on the surface where the active layer is in contact with the current collector, and may ultimately result in deterioration of the peel strength on the current collector in the active layer.

However, the electrode of the present invention can provide the active layer having excellent peel strength on the current collector by preventing the segregation phenomenon by a method to be described below and satisfying the BMI (I/S) value in a predetermined range.

The BMI (Binder Migration Index) (I/S) is a parameter capable of knowing the distribution tendency of the binder in the electrode.

Specifically, the BMI (I/S) means a ratio of BMI (Interface) to BMI (Surface), where BMI (Interface) means an amount (%) of the binder present in a region corresponding to 0% to 15% in the thickness direction of the active layer, on the basis of the surface of the active layer in contact with the current collector, relative to the amount of the total binder present in the active layer, and BMI (Surface) means an amount (%) of the binder present in a region corresponding to 85% to 100% in the thickness direction of the active layer, on the basis of the surface of the active layer in contact with the current collector, relative to the amount of the total binder present in the active layer.

That is, the smaller the BMI (I/S) value is, the content of the binder is relatively more distributed on the electrode surface (upper surface) and thus the segregation phenomenon is serious, which may mean that the binding force between the current collector and the active layer is lowered, while the larger the BMI (I/S) value is, the content of the binder is relatively low on the surface of the electrode and thus the segregation phenomenon does not occur, which may mean that the binding force between the current collector and the active layer is excellent.

In one example, the electrode of the present invention may have a BMI (I/S) in the range of 0.018 to 0.300. In another example, the electrode of the present invention may have a BMI (I/S) in the range of 0.020 to 0.300, 0.040 to 0.300, 0.060 to 0.300, or 0.080 to 0.300.

For example, the electrode according to the present invention may have a BMI (Interface) in the range of 0.8% to 6.0%. In another example, the electrode according to the present invention may have a BMI (Interface) in the range of 1.0% to 6.0%, 1.2% to 6.0%, or 1.4% to 6.0%.

In addition, the electrode according to the present invention may have a BMI (Surface) in the range of 22.0% to 42.3%. In another example, the electrode according to the present invention may have a BMI (Surface) in the range of 22.0% to 40.0%, 22.0% to 38.0%, or 22.0% to 36.0%.

It is possible to achieve excellence of the peel strength of the desired electrode within such a range of BMI (Interface) and BMI (Surface).

For example, after exposing all of the cross-section along the electrode depth by oblique cutting of the electrode, the BMI (I/S) may be calculated by measuring the amount of the binder along the depth of each electrode by using the IR method.

In one example, the BMI (I/S) may be calculated through an oblique cutting process capable of exposing all of the cross-section along the depth of the electrode to the outside and a process for measuring the amount of the binder on the exposed surface of the active layer by the oblique cutting, for example, expressing a graph of the distribution of the binder according to the depth of the electrode based on the absorption spectrum calculated using an infrared spectroscopy apparatus (ATR IR spectroscopy) by a total reflection method and adding up integral intensities at depth. Within the above range, the electrode of the present invention can have an active layer with excellent peel strength on the current collector.

In one example, the electrode of the present invention may comprise an active layer having peel strength of 30 gf/cm or more on the current collector when an electrode specimen having a size of 15×150 mm$^2$ is measured at room temperature with a peeling speed of 0.3 m/min and a peeling angle of 180 degrees.

In another example, the peel strength may be 32 gf/cm or more, or 33 gf/cm or more, but is not limited thereto. The large peel strength means that the binding force of the active layer to the current collector is excellent, and therefore the upper limit of the peel strength is not particularly limited. For example, the active layer may have peel strength of 100 gf/cm or less, 90 gf/cm or less, 80 gf/cm or less, 70 gf/cm or less, 60 gf/cm or less, or 50 gf/cm or less, but is not limited thereto.

The electrode of the present invention comprises a current collector.

As the collector, one generally used in production of an electrode for a secondary battery can be selected without particular limitation.

In one example, as the current collector, stainless steel, aluminum, nickel, titanium, calcined carbon, copper or aluminum is used, and if necessary, a surface treatment using carbon, nickel, titanium or silver, and the like may be performed on the surface of the stainless steel or the like.

If necessary, fine irregularities may be formed on the surface of the current collector of the present invention, and such irregularities may help improve adhesion with the active layer. The method of roughening the surface of the current collector of the present invention is not particularly limited, and for example, a known method such as mechanical polishing, electrolytic polishing or chemical polishing may be applied.

The current collector may have various forms such as, for example, a film, a sheet, a foil, a net, a porous body, a foam or a nonwoven fabric.

The thickness of the current collector is not particularly limited and may be set in an appropriate range in consideration of mechanical strength of a positive-electrode, productivity, capacity of a battery, and the like. For example, as the current collector, one generally having a thickness in a range of 3 μm to 500 μm, 10 μm to 400 μm or 50 μm to 300 μm may be used, but is not limited thereto.

The electrode of the present invention may comprise a current collector and an active layer formed on the current collector and having a binder. The active layer may mean a layer formed by applying a composition for forming an active layer comprising an active material, a conductive material and a binder on a current collector, followed by drying and the like.

An active layer may be formed on the current collector. In addition, a binder may be included in the active layer.

In one example, the binder that may be included in the active layer may be polyvinylidene fluoride (PVDF), polyvinyl alcohol, carboxymethylcellulose (CMC), hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, acrylic copolymer or fluorine rubber, and the like.

More specifically, the binder that may be contained in the active layer of the present invention may be, for example, a fluorine binder or an acrylic binder.

The term fluorine binder may mean a binder containing fluorine atoms such as polyvinylidene fluoride (PVDF), and the term acrylic binder may mean a binder containing a polymerized unit of a (meth) acrylic acid ester such as an acrylic copolymer.

In addition, the term (meth) acrylic acid may mean acrylic acid or methacrylic acid, and the term polymerized unit of a specific compound may mean a state in which the specific compound is polymerized and included in the main chain or side chain of the polymer formed by polymerizing the specific compound.

The binder may be included in the active layer at a ratio of 0.1 to 10 parts by weight relative to 100 parts by weight of the active layer. In the present invention, the term part by weight may mean a weight ratio between the respective components, unless otherwise indicated. In the present invention, the weight of the active layer may mean a weight of a composition for forming an active layer to be described below, for example, an active layer forming composition.

The active layer may also comprise a conductive material and an active material.

As the conductive material contained in the active layer, known ones may be used without limitation, and for example, graphite such as natural graphite or artificial graphite; carbon black such as carbon black, acetylene black, Ketjen black, channel black, furnace black, lamp black, or thermal black; conductive fibers such as carbon fibers or metal fibers; metal powder such as carbon fluoride, aluminum, or nickel powder; conductive whiskers such as zinc oxide or potassium titanate; conductive metal oxides such as titanium oxide; or conductive materials such as polyphenylene derivatives may be used, but is not limited thereto.

The ratio of the conductive material may be selected in consideration of performance of the desired battery, without being particularly limited, and for example, may be included in the active layer at a ratio of 0.1 to 10 parts by weight relative to 100 parts by weight of the active layer.

In the active material contained in the active layer, for example, when the electrode is a positive-electrode, as the positive-electrode active material, a layered compound such as lithium cobalt oxide ($LiCoO_2$) or lithium nickel oxide ($LiNiO_2$), or a compound substituted with one or more transition metals; lithium manganese oxide such as the formulas $Li_{1+x}Mn_{2-x}O_4$ (where, x is 0 to 0.33), $LiMnO_3$, $LiMn_2O_3$, and $LiMnO_2$; lithium copper oxide ($Li_2CuO_2$);

vanadium oxide such as $LiV_3O_8$, $LiFe_3O_4$, $V_2O_5$, and $Cu_2V_2O_7$; Ni-site type lithium nickel oxide represented by the formula $LiNi_{1-x}M_xO_2$ (where, M=Co, Mn, Al, Cu, Fe, Mg, B or Ga, and x=0.01 to 0.3); lithium manganese composite oxide represented by the formula $LiMn_{2-x}M_xO_2$ (where, M=Co, Ni, Fe, Cr, Zn or Ta, x=0.01 to 0.1) or $Li_2Mn_3MO_8$ (where, M=Fe, Co, Ni, Cu or Zn); lithium manganese composite oxide having a spinel structure such as $LiNi_xMn_{2-x}O_4$ (x=0.01 to 0.6); $LiMn_2O_4$ in which a part of Li in the formula is substituted with an alkaline earth metal ion; disulfide compound; $Fe_2(MoO_4)_3$, or the like may be used, and $LiNi_{0.4}Mn_{1.6}O_4$ may be also used.

When the electrode is a negative-electrode, as the active material, for example, an active material capable of absorbing and desorbing lithium ions may be used. As the specific example, natural graphite, artificial graphite, lithium, silicon, tin, germanium, lithium titanate, and alloys or mixtures thereof and the like can be used.

The ratio of the active material may be selected in consideration of performance of the desired battery, without being particularly limited, and for example, may be included in the active layer at a ratio of 70 to 99.5 parts by weight relative to 100 parts by weight of the active layer.

Also, the active layer of the present invention may further comprise various additives in addition to the above-described components within a range that does not impair physical properties of the electrode. For example, the additive may be exemplified by, but is not limited to, a stabilizer, a dispersant, a surfactant, a defoamer, or a cross-linker, and the like. The electrode may comprise one or more of the aforementioned additives.

The present invention also relates to a method for manufacturing the electrode.

In one example, the present invention may be directed to a method for manufacturing the electrode comprising a step of applying a composition for forming an active layer containing a binder, a conductive material and an active material on a current collector, followed by drying, wherein a BMI (I/S) is in a range of 0.018 to 0.300.

In the method for manufacturing the electrode according to the present invention, the temperature profile of the step of drying the composition for forming an active layer is U-shaped and the temperature of the fixed rate evaporating step is kept as low as possible, so that occurrence possibility of the segregation phenomenon in which the binder in the composition for forming an active layer applied on the current collector moves into the surface layer direction of the electrode upon evaporation of the solvent can be reduced.

In addition, the method for manufacturing the electrode according to the present invention comprises a step of removing the residual solvent at a temperature lower than the preheating step and a step of reducing the temperature after the step of lapse rate evaporating and thus may completely remove the residual solvent, prevent structural deformation of the electrode due to sudden exposure to ambient temperature and secure excellent peel strength on the current collector.

The method for manufacturing the electrode according to the present invention may comprise applying a composition for an active layer on a current collector.

The composition for an active layer may comprise a binder, a conductive material and an active material. The kinds and contents of the binder, the conductive material and the active material, contained in the composition for an active layer are as described above.

Also, the composition for forming an active layer may further comprise a solvent. The type of the solvent can be appropriately set in consideration of the intended performance and the like, and for example, an organic solvent such as N-methyl-2-pyrrolidone, propylene carbonate, ethylene carbonate, butylene carbonate, dimethyl carbonate, diethyl carbonate, gamma-butylolactone, 1,2-dimethoxyethane, tetrahydrofuran, 2-methyltetrahydrofuran, dimethylsulfoxide, formamide, dimethylformamide, acetonitrile, nitromethane, methyl formate, methyl acetate, phosphate triester, trimethoxy methane, sulfolane, methyl sulfolane, 1,3-dimethyl-2-imidazolidinone, propylene carbonate derivatives, tetrahydrofuran derivatives, methyl propionate or ethyl propionate may be used, but is not limited thereto.

The solvent may be contained in the composition for forming an active layer, for example, at a ratio of 30 to 60 parts by weight relative to 100 parts by weight of the composition for forming an active layer.

The method for applying the composition for forming an active layer on the current collector is not particularly limited and a known applying method, for example, a known applying method including a bar coating method, a screen coating method, a doctor blade method, a dipping method, a reverse roll method, a direct roll method or a gravure method may be applied.

The application amount of the composition for the active layer of the present invention on the current collector is not particularly limited and for example, may be adjusted within a range in which an active layer with the finally desired thickness can be formed.

The method for manufacturing an electrode according to the present invention may comprise a step of applying the composition for forming an active layer on a current collector, followed by drying.

The step of drying may comprise, for example, the following steps 1) to 4).

1) a step of preheating a current collector applied by a composition for forming an active layer;
2) a step of fixed rate evaporating the preheated current collector;
3) a step of lapse rate evaporating; and
4) a step of removing a residual solvent at a temperature lower than the preheating step.

As described above, the method for manufacturing an electrode according to the present invention can prevent the segregation phenomenon by subdividing the drying step of the composition for forming an active layer applied on the current collector into a preheating step, a fixed rate evaporating step, a lapse rate evaporating step and a residual solvent removing step, and especially performing the temperature of the fixed rate evaporating step, for example, at a temperature lower in the range of 25° C. to 60° C. than that of the preheating step to minimize migration of the binder in the surface layer direction due to abrupt evaporation of the solvent.

The steps 1) to 4) may be carried out, for example, in a drying furnace including drying zones formed at predetermined intervals.

In one example, the steps 1) to 4) can be carried out in a drying furnace including a hot air generating part capable of hot-air drying both surfaces of a current collector applied by the composition for forming an active layer, and 6 to 10 drying zones, without being limited thereto.

Step 1) is a step of preheating the current collector applied by the composition for forming an active layer, which may mean a step of giving heat quantity until evaporation of the solvent in the composition for forming an active layer is started by introducing a current collector into the fixed rate evaporating process.

The step 1) can be carried out, for example, in one or two drying zones in a drying furnace. In addition, the step 1) may be carried out, for example, within a range of 150° C. to 180° C. In another example, the step 1) can be carried out within the range of 150° C. to 170° C. or 155° C. to 165° C.

When the step 1) is carried out, the residual solvent in the composition for forming an active layer may be, for example, 90% or more, 91% or more, 92% or more, 93% or more, 94% or more, or 95% or more. In the present invention, the % by weight of the residual solvent may mean an amount of the solvent remaining in the active layer after completing each step based on 100% by weight of the solvent introduced to the initial composition for forming an active layer.

Step 2) is a step of fixed rate evaporating the current collector applied by the composition for forming an active layer, which may mean a step of continuously evaporating the solvent while inhibiting the components such as the binder component and the conductive material from moving to the electrode surface layer.

The step 2) can be usually carried out in a temperature condition of around 15° C. difference similar to the preheating step to continuously evaporate the solvent. However, if the temperature condition of step 2) is set too high to evaporate the solvent, the segregation phenomenon in which the binder moves to the surface layer of the electrode may occur, and thus, the step is required to be carried out under a temperature condition such that the solvent can be sufficiently evaporated with a predetermined difference from the temperature of the preheating step.

In one example, the step 2) may be performed at a lower temperature in the range of 25° C. to 60° C. relative to the step 1). After completing the step 2) in the above temperature range, the desired residual solvent amount (%) can be achieved, and at the same time, the surface layer migration phenomenon of the binder can be suppressed. In another example, the step 2) may be carried out at a lower temperature in the range of 30° C. to 55° C. or 35° C. to 50° C. relative to the step 1).

The step 2) can be carried out, for example, in two to six drying zones in a drying furnace. The step 2) is not limited as long as it is performed within a range that satisfies the above-described temperature range difference from the step 1). For example, the step 2) may be performed within a temperature range of 90° C. to 155° C. or 105° C. to 130° C. When the step 2) is carried out, the solvent in the composition for forming an active layer may be, for example, 5% by weight or less, 4% by weight or less, or 3% by weight or less. Furthermore, when the step 2) is carried out, the residual solvent may be 1% by weight or more. That is, after completing the step 2), the residual solvent in the electrode may be in the range of 1% by weight to 5% by weight.

Step 3) is a step of lapse rate evaporating the current collector applied by the composition for forming an active layer, which may mean a step designed so that the removal rate of the residual solvent is decreased, but after passing through the step 3), the desired residual solvent amount can be achieved.

In one example, the step 3) can be carried out in one to three drying zones in a drying furnace.

In addition, the step 3) may be performed within a temperature range of 95° C. to 105° C. In another example, the step 3) may be performed within a temperature range of 98° C. to 102° C.

After completing the step 3), the residual solvent in the electrode may be in the range of 0.05% by weight to 0.8% by weight.

Step 4) is a step of removing residual solvent for removing the solvent remaining in the current collector applied by the composition for an active layer, which may mean a step for removing the remaining solvent that is not removed by the steps 1) to 3) to form an active layer.

The residual solvent removing step of the present invention may be performed, for example, at a temperature lower than the preheating step.

Specifically, when the residual solvent removing step is performed at a temperature lower than the preheating step, for example, in a temperature condition within the range of 130° C. to 145° C., the step may form the desired active layer by removing the remaining solvent, prevent the structural deformation of the electrode due to the temperature difference from a step of reducing the temperature to be described below, and secure the desired characteristics of the electrode.

In one example, the step 4) can be performed in one to three drying zones in a drying furnace. Also, the step 4) can be performed within a temperature range of 130° C. to 145° C. In another example, the step 4) can be performed within a temperature range of 135° C. to 145° C.

When the step 4) is carried out, the residual solvent in the composition for forming an active layer may be, for example, 0.05% by weight or less, 0.04% by weight or less, 0.03% by weight or less, 0.02% by weight or less, or 0.01% by weight or less.

When the steps 1) to 4) are carried out, the active layer is formed on the current collector, and the active layer may have, for example, a peel strength of 30 gf/cm or more on the current collector when an electrode specimen having a size of 15×150 mm² is measured at room temperature with a peeling speed of 0.3 m/min and a peeling angle of 180 degrees.

In addition, after carrying out the drying steps 1) to 4), an electrode having a BMI (I/S) in the range of 0.018 to 0.300 can be produced when the content of the binder is measured depending on the depth of the electrode.

Also, the drying step of the present invention may further comprise, after the step 4), a step of reducing the temperature to a temperature lower in the range of 50° C. to 100° C. than the temperature of the step 4).

The step of reducing the temperature may mean a step for preventing structural deformation of the electrode capable of occurring when suddenly exposed to the atmosphere after the step 4) for evaporation of the residual solvent.

In one example, the step of reducing the temperature may be carried out within a temperature range of 30° C. to 60° C.

Also, in the manufacturing method of the present invention, known processes required for production of an electrode after the drying step for forming the active layer, for example, a rolling process, and the like may be performed as necessary.

The present invention also relates to a battery comprising such an electrode. The battery may be, for example, a secondary battery, specifically, a lithium secondary battery. The specific structure of the battery and other configurations other than the electrode are not particularly limited, and various configurations known to the battery and the like can be selected and used without limitation.

Hereinafter, the present invention will be described in detail with reference to Examples according to the present invention and Comparative Examples not complying with the present invention, but the scope of the present invention is not limited by the following examples and the like. Physical properties shown in this Example and Comparative Examples were evaluated in the following manner.

[1. Mixing Method of Composition for Forming Active Layer]

A PVDF binder, a conductive material and an active material are introduced into an agitation vessel and agitated using a planetary mixer. After confirming the state of the paste visually, N-methylpyrrolidone (NMP) is repeatedly added in small amounts and stirred so as to become a coatable viscosity to prepare a composition for forming an active layer.

[2. Formation of Active Layer]

The composition for forming an active layer is applied on an aluminum current collector foil using a comma coater. The coating thickness is controlled by adjusting the coating speed and the gap of the coater slit. The coated electrode is dried in a drying furnace with 10 drying zones for 30 minutes. The electrode is cut to an appropriate size and then pressed with a roll press to repeat the rolling until the desired porosity is reached. The rolled electrode is further dried in a 100 to 150° C. vacuum oven for 12 hours, if necessary.

[3. Peel Strength Evaluation Method]

A double-sided tape is attached to a slide glass of 26×76×1 mm. A 3M cellophane tape, the adhesive side of which is upward, is attached on the double-sided tape. The electrode sample cut to a size of 15×150 mm$^2$ is attached to the adhesive side of the cellophane tape and then pushed once with a hand laminator. Three specimens per each electrode sample are prepared and the peel strength is measured immediately after attaching them. It is measured under conditions of 180 degrees and 0.3 m/min using a physical property analyzer (Texture analyzer, TA).

[4. BMI (I/S) Calculation Method]

By obliquely cutting the prepared electrode using a diamond cutter, the cross-section along the entire depth of the electrode is exposed and then the distribution of the binder along the depth of the electrode based on the absorption spectrum using an infrared spectroscopic analyzer (ATR IR spectroscopy) is expressed as a graph and integral intensities at depth are added up to calculate a BMI (I/S) by calculating a BMI (Interface) and a BMI (Surface).

Example 1

Preparation of Composition for Forming Active Layer

A composition for forming an active layer was prepared by introducing about 38.9 parts by weight of N-methylpyrrolidone (NMP) solvent to a mixture of a PVDF binder, a conductive material (Denka black) and an active material (binder:conductive material:active material=91.5:4.3:4.2) so that the total solid content was about 68%.

Manufacture of Electrode

The composition for forming an active layer was applied on an aluminum current collector foil using a comma coater. Subsequently, in a drying furnace including 10 drying zones and a hot air generating part capable of hot-air drying the upper and lower portions of the electrode, a preheating process (first zone, about 150° C. to 180° C., air volume 1,200 rpm to 1,600 rpm), a fixed rate evaporating process (second to fifth zones, about 105° C. to 130° C., air volume 1,200 rpm to 1,600 rpm) To 1,000 rpm), a lapse rate evaporating process (sixth and seventh zones, about 90° C. to 105° C., air volume 500 rpm to 1,000 rpm) and a residual solvent removing process (eighth and ninth zones, about 130° C. to 145° C., air volume 500 rpm to 1,000 rpm) were sequentially practiced. After the residual solvent removing process, a process of reducing the temperature in the temperature range of about 40° C. to 60° C. (tenth zone) was performed to produce an electrode comprising the active layer formed on the current collector. The peel strength of the active layer on the current collector and the BMI (I/S) value in the electrode are shown in Table 1 below.

Comparative Example 1

An electrode was prepared in the same manner as in Example 1, except that the current collector applied by the composition for forming an active layer was subjected to steps of constantly drying at a temperature of about 130° C. in 10 drying zones. The peel strength of the active layer on the current collector and the BMI (I/S) value in the electrode according to Comparative Example 1 are shown in Table 1 below.

Comparative Example 2

An electrode was prepared in the same manner as in Example 1, except that the current collector applied by the composition for forming an active layer was subjected to a preheating process (first and second drying zones, about 130° C. to 135° C., air volume about 50 Nm$^3$/min), a fixed rate evaporating process (third to eighth drying zones, about 120° C. to 125° C., air volume about 100 Nm$^3$/min) and a lapse rate evaporating process (ninth and tenth drying zones, about 135° C. to 140° C., air volume about 70 Nm$^3$/min) in the temperature ranges. The peel strength of the active layer on the current collector and the BMI (I/S) value in the electrode according to Comparative Example 2 are shown in Table 1 below.

TABLE 1

|  | Example 1 | Comparative Example 1 | Comparative Example 2 |
| --- | --- | --- | --- |
| Composition for forming active layer | PVDF binder:Denka black conductive material:active material = 91.5:4.3:4.2 | | |
| BMI(I) | 5.9% | 0.6% | 0.7% |
| BMI(S) | 24.3% | 75.3% | 58.2% |
| BMI(I/S) | 0.24 | 0.008 | 0.012 |
| Peel Strength (gf/cm) | 40 | 23 | 27 |

The invention claimed is:

1. An electrode comprising:
a current collector; and
an active layer formed on said current collector and having a binder,
wherein the active layer consists of a single layer, and
wherein a BMI (I/S) represented by Equation 1 below is in a range of 0.018 to 0.300:

BMI(I/S)=BMI(Interface)/BMI(Surface)　　　[Equation 1]

where, BMI (Interface) means an amount (%) of the binder present in a region corresponding to 0% to 15% in the thickness direction of the active layer, on the basis of a surface of the active layer in contact with the current collector, relative to the amount of the total binder present in the active layer, and BMI (Surface) represents an amount (%) of the binder present in a region corresponding to 85% to 100% in the thickness direction of the active layer, on the basis of the surface of the active layer in contact with the current collector, relative to the amount of the total binder present in the active layer.

2. The electrode according to claim 1, wherein the BMI (Interface) is in a range of 0.8% to 6.0%.

3. The electrode according to claim 1, wherein the BMI (Surface) is in a range of 22.0% to 42.3%.

4. The electrode according to claim 1, wherein the current collector is stainless steel, nickel, titanium, calcined carbon, copper or aluminum.

5. The electrode according to claim 1, wherein the binder is an acrylic binder or a fluorine binder.

6. The electrode according to claim 1, wherein the active layer further comprises a conductive material and an active material.

7. The electrode according to claim 1, wherein the active layer further comprises at least one additive selected from a stabilizer, a dispersant, a surfactant, a defoamer and a cross-linker.

8. The electrode according to claim 1, wherein the active layer has a peel strength of 30 gf/cm or more on the current collector when an electrode specimen having a size of 15×150 mm2 is measured at room temperature with a peeling speed of 0.3 m/min and a peeling angle of 180 degrees.

9. A method for manufacturing the electrode of claim 1, comprising a step of applying a composition for forming an active layer containing a binder, a conductive material and an active material on a current collector, followed by drying.

10. The method for manufacturing the electrode according to claim 9, wherein the step of drying comprises the following steps 1) to 4):

1) a step of preheating a current collector applied by a composition for forming an active layer;
2) a step of fixed rate evaporating said preheated current collector;
3) a step of lapse rate evaporating; and
4) a step of removing a residual solvent at a temperature lower than said preheating step.

11. The method for manufacturing the electrode according to claim 10, wherein
the step 1) is carried out in a range of 150° C. to 180° C.

12. The method for manufacturing the electrode according to claim 10, wherein
the step 2) is carried out at a lower temperature in the range of 25° C. to 60° C. relative to the step 1).

13. The method for manufacturing the electrode according to claim 10, wherein
the residual solvent in the electrode is in a range of 1% by weight to 5% by weight after completing the step 2).

14. The method for manufacturing the electrode according to claim 10, wherein
the step 3) is carried out in a range of 90° C. to 105° C.

15. The method for manufacturing the electrode according to claim 10, wherein
the residual solvent in the electrode is in a range of 0.05% by weight to 0.8% by weight after completing the step 3).

16. The method for manufacturing the electrode according to claim 10, wherein
the step 4) is carried out in a range of 130° C. to 145° C.

17. The method for manufacturing the electrode according to claim 10, wherein
the residual solvent in the electrode is 0.05% by weight or less after completing the step 4).

18. The method for manufacturing the electrode according to claim 10, wherein
the step of drying further comprises, after the step 4), a step of reducing the temperature to a temperature lower in the range of 50° C. to 100° C. than the temperature of the step 4).

19. A battery comprising the electrode of claim 1.

* * * * *

UNITED STATES PATENT AND TRADEMARK OFFICE
CERTIFICATE OF CORRECTION

PATENT NO. : 10,601,048 B2
APPLICATION NO. : 15/564955
DATED : March 24, 2020
INVENTOR(S) : Jun et al.

Page 1 of 1

It is certified that error appears in the above-identified patent and that said Letters Patent is hereby corrected as shown below:

In the Specification

At Column 11, Line 55, the ratio of values should be – 4.2:4.3:91.5 –.
At Column 12, Line 43, the ratio of values should be – 4.2:4.3:91.5 –.

Signed and Sealed this
Sixth Day of May, 2025

Coke Morgan Stewart
*Acting Director of the United States Patent and Trademark Office*